(12) United States Patent
Bernard

(10) Patent No.: US 8,783,005 B1
(45) Date of Patent: Jul. 22, 2014

(54) MOW AND ROW APPARATUS

(76) Inventor: James F. Bernard, Joshua, TX (US)

( * ) Notice: Subject to any disclaimer, the term of this patent is extended or adjusted under 35 U.S.C. 154(b) by 280 days.

(21) Appl. No.: 13/531,999

(22) Filed: Jun. 25, 2012

(51) Int. Cl.
*A01D 34/00* (2006.01)

(52) U.S. Cl.
USPC .......................................................... 56/13.7

(58) Field of Classification Search
USPC .......... 56/12.7, 13.5, 13.6, 13.7, DIG. 9, 16.9
See application file for complete search history.

(56) References Cited

U.S. PATENT DOCUMENTS

| | | | |
|---|---|---|---|
| 2,707,858 A * | 5/1955 | Katzen et al. ................. | 56/11.5 |
| 2,960,811 A * | 11/1960 | Roesel ........................... | 56/10.4 |
| 3,236,037 A * | 2/1966 | Porterfield .................... | 56/13.7 |
| 3,604,208 A * | 9/1971 | Borunda ........................ | 56/11.5 |
| 4,107,901 A | 8/1978 | Moore | |
| 4,112,653 A | 9/1978 | Ballas et al. | |
| 4,896,488 A * | 1/1990 | Duncan et al. ................. | 56/13.7 |
| 5,040,360 A * | 8/1991 | Meehleder .................... | 56/11.6 |
| 5,174,100 A * | 12/1992 | Wassenberg .................. | 56/12.7 |
| 5,226,284 A * | 7/1993 | Meehleder .................... | 56/11.6 |
| 5,560,189 A * | 10/1996 | Devillier et al. .............. | 56/13.6 |
| 5,598,689 A * | 2/1997 | Bork .............................. | 56/13.7 |
| 6,343,461 B1 * | 2/2002 | Knott ............................. | 56/16.9 |
| 6,381,936 B1 * | 5/2002 | Lin ................................ | 56/16.7 |
| 6,474,053 B1 * | 11/2002 | Lund ............................. | 56/13.7 |
| 6,546,706 B1 * | 4/2003 | Nafziger ....................... | 56/13.7 |
| 6,779,325 B1 * | 8/2004 | Robillard, II ................. | 56/12.7 |
| 6,892,518 B1 * | 5/2005 | Bares ............................ | 56/12.7 |
| 7,165,383 B1 * | 1/2007 | Luton, Jr. ...................... | 56/12.7 |
| 7,219,488 B2 * | 5/2007 | Hatfield ........................ | 56/13.6 |
| 7,549,278 B2 * | 6/2009 | McMahan ..................... | 56/13.7 |
| 7,658,057 B1 * | 2/2010 | O'Dell .......................... | 56/16.9 |
| 7,712,293 B1 * | 5/2010 | Recker .......................... | 56/14.9 |
| 7,900,428 B1 * | 3/2011 | Maldonado ................... | 56/13.7 |
| 8,001,752 B1 * | 8/2011 | Lin ................................ | 56/12.7 |
| 8,046,980 B1 * | 11/2011 | Schroeck ...................... | 56/12.7 |
| 2004/0237491 A1 * | 12/2004 | Heighton et al. ............. | 56/12.7 |
| 2007/0298967 A1 | 12/2007 | Kelley | |
| 2008/0173000 A1 * | 7/2008 | Skinner et al. ................ | 56/16.9 |
| 2008/0216459 A1 * | 9/2008 | Spitzley ........................ | 56/12.7 |

* cited by examiner

*Primary Examiner* — Thomas B Will
*Assistant Examiner* — Joan D Misa

(57) ABSTRACT

In one embodiment of the invention, a mow and row apparatus includes: a lawn mower including a mower deck, a handle, a lawn mower motor, and a lawn mower blade configured for rotation by the lawn mower motor, and wherein the lawn mower further includes at least one expandable and retractable trimmer. In another embodiment of the invention, a method for assembling a mow and row apparatus, includes: providing a lawn mower; attaching a circuitry to the lawn mower; and attaching at least one trimmer to the circuitry.

20 Claims, 6 Drawing Sheets

MOW AND ROW APPARATUS

TECHNICAL FIELD

Embodiments of the invention relate generally to lawn mowers.

BACKGROUND

Generally, the job of mowing and trimming a lawn requires two different tasks. The first task typically involves using a lawn mower to trim the grass on the lawn, and the second task typically involves using a hand-held trimmer to trim the grass in hard to reach areas adjacent to the lawn such as, for example, areas adjacent fences, buildings, shrubs, and/or trees.

Previous attempts have been made to combine these two tasks into a single apparatus so that the time for performing yard maintenance is reduced and the consumer is not subjected to the additional expense of buying multiple grass-cutting equipments (lawn mower and weed-eater). For example, U.S. Pat. No. 6,474,053 discloses a lawn mower with a trimmer mounted in the front of the lawn mower deck. U.S. Pat. No. 5,048,276 discloses a lawn mower with a fixed-position trimmer assembly at the side of the mower. U.S. Pat. No. 4,170,099 also discloses a trimmer assembly at the side of the mower, but the trimmer assembly is required to be rotated downward. U.S. Pat. No. 5,560,189 discloses a mower with a horizontal trimming apparatus. However, these previous devices are mechanically complicated, large in size, fixed in configuration, and/or not flexible in movements.

Based on the above discussion, the current technology is limited in its capabilities and suffers from at least the above constraints and deficiencies.

SUMMARY

In one embodiment of the invention, a mow and row apparatus includes: a lawn mower including a mower deck, a handle, a lawn mower motor, and a lawn mower blade configured for rotation by the lawn mower motor, and wherein the lawn mower further includes at least one expandable and retractable trimmer. The trimmer may also be vertically movable.

In another embodiment of the invention, a mow and row apparatus includes: a lawn mower including a mower deck, a handle, a lawn mower motor, and a lawn mower blade configured for rotation by the lawn mower motor, and wherein the lawn mower further includes at least one means for trimming. The means for trimming may also be vertically movable.

In yet another embodiment of the invention, a method for assembling a mow and row apparatus, includes: providing a lawn mower; attaching a trimmer control assembly to the lawn mower; attaching at least one trimmer to the trimmer control assembly; and electrically connecting the trimmer control assembly to at least one actuator.

In yet another embodiment of the invention, a method of assembling a mow and row apparatus, includes: providing a lawn mower; attaching a circuitry to the lawn mower; and attaching at least one trimmer to the circuitry.

Other possible variations in an embodiment of the invention are disclosed below.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

Additionally, the left-most digit of a reference number may identify the drawing in which the reference number first appears unless otherwise indicated.

DETAILED DESCRIPTION OF PREFERRED EMBODIMENTS

Figure 1:
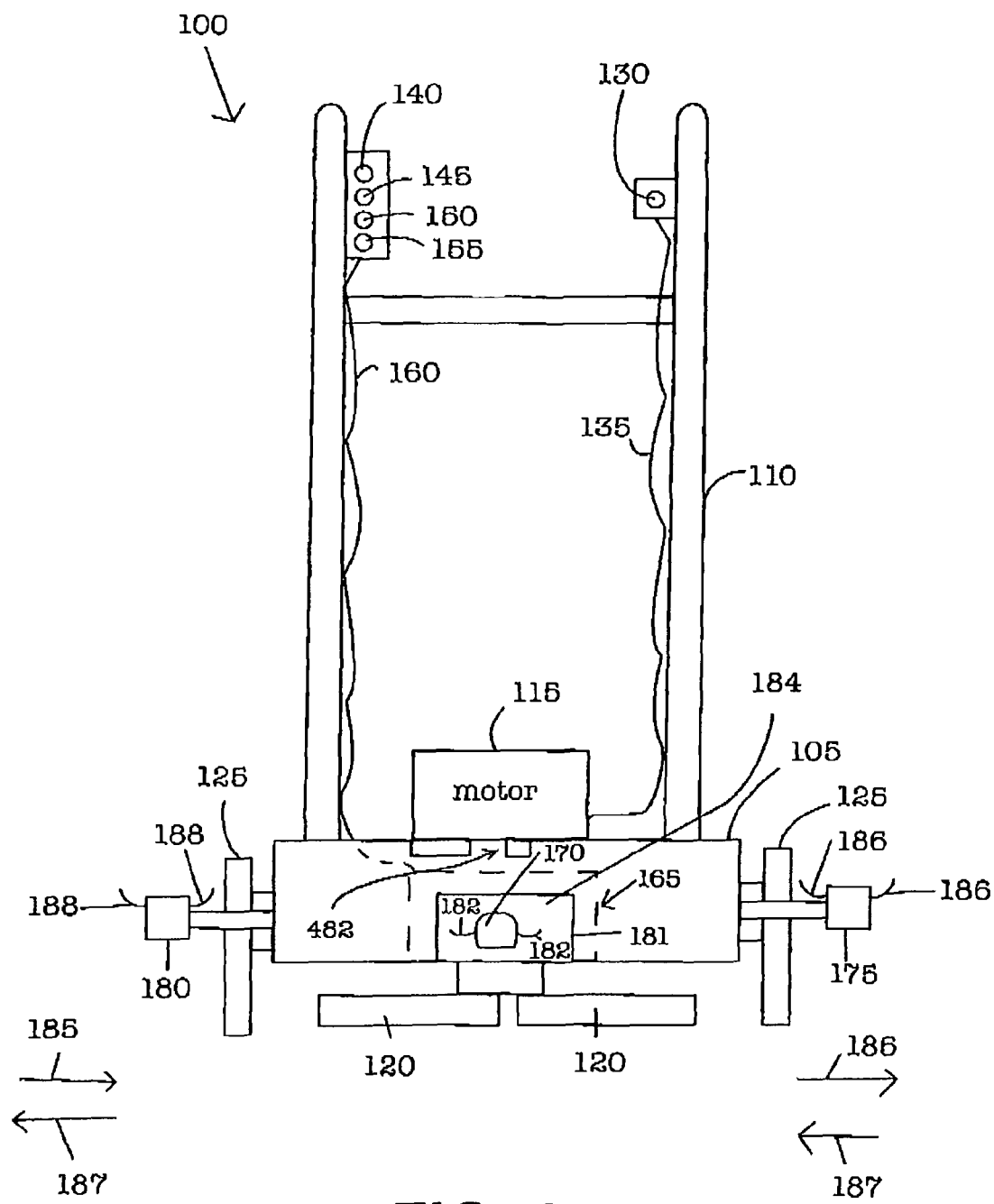
FIG. 1 is a block diagram of a mow and row apparatus, in accordance with an embodiment of the invention.

In the description herein, numerous specific details are provided, such as examples of components, parts, structures, and/or methods, to provide a thorough understanding of embodiments of the invention. One skilled in the relevant art(s) will recognize, however, that an embodiment of the invention can be practiced without one or more of the specific details, or with other apparatus, systems, methods, components, materials, parts, structures, and/or the like. In other instances, well-known structures, materials, or operations are not shown or described in detail to avoid obscuring aspects of embodiments of the invention. Additionally, the figures are representative in nature and their shapes are not intended to illustrate the precise shape or precise size of any element and are not intended to limit the scope of the invention.

Those skilled in the relevant art(s) will understand that when an element or part in the drawings is referred to as being "on" (or "connected" to or "coupled" to or "attached" to) another element, it can be directly on (or attached to) the other element or intervening elements may also be present. Furthermore, relative terms such as "inner", "outer", "upper", "above", "lower", "beneath", and "below", "upward", "downward", "clockwise", "counter-clockwise", and similar terms, may be used herein to describe a relationship of one element to another element. It is understood that these terms are intended to encompass different orientations of the device in addition to the orientation depicted in the figures.

Although the terms first, second, and the like may be used herein to describe various elements, components, parts, regions, layers, chamber, and/or sections, these elements, components, parts, regions, layers, chambers, and/or sections should not be limited by these terms. These terms are only used to distinguish one element, component, part, region, layer, region, chamber, or section from another element, component, part, region, layer, chamber, or section. Thus, a first element, component, part, region, layer, chamber, or section discussed below could be termed a second element, component, part, region, layer, chamber, or section without departing from the teachings of the present invention.

Embodiments of the invention are described herein with reference to cross-sectional view illustrations that are schematic illustrations of representative embodiments of the invention. As such, variations from the shapes of the illustrations as a result of, for example, manufacturing techniques and/or tolerances are expected. For purposes of avoiding in overcrowding the drawings, the elements shown in the drawings are not necessarily drawn to scale, and the elements may be larger in physical size or smaller in physical size than as shown in the drawings.

Embodiments of the invention should not be construed as limited to the particular shapes of the regions or components/parts/elements illustrated herein but are to include deviations in shapes that result, for example, from manufacturing or particular implementations. For example, an element illustrated or described as square or rectangular may typically have rounded or curved features due to normal manufacturing tolerances or due to a particular implementation. Thus, the elements illustrated in the figures are schematic in nature and their shapes are not intended to illustrate the precise shape of an element of a device and are not intended to limit the scope of the invention.

In an embodiment of the invention, a revolutionary home improvement product that makes landscaping easier, faster, and cheaper as compared to previous products. In an embodiment of the invention, a mow and row apparatus provides an all-in-one home-improvement product that simultaneously performs the functions of a weed-eater and lawn mover. Possible advantages and/or benefits provide by an embodiment of the invention at least include saving time and money for the user, minimizing physical strain, minimizing time-intensive and tiring rounds around the lawn, providing ability to trim tough-to-reach areas (e.g., areas near fences, trees, shrubs, and against the house), providing control trimmer deployment, retraction, and operation, and/or providing customizable trimmer speed control. Accordingly, the user only needs a single piece of equipment provided by an embodiment of the invention to perform the above operation. Therefore, when the user hits, e.g., a patch of weeds or a tough spot near a fence or the house, the user can press a button on the side of the handle on the apparatus to activate the weed-eater. Once the button is pressed or actuated, the trimmer control assembly releases (extends) the weed-eater from the mower deck. The weed-eater's trimmer rotates with flailing lines that can cut grass, vegetation, weeds, and other vegetation. Once the area is cut, the user can press or actuate the button again and the weed-eater will fold back into the deck. In an embodiment, the mow and row apparatus also includes a customizable control panel that lets the user increase the frequency of the spin of the blades from low to high and vice versa.

FIG. 1 is a block diagram of a mow and row apparatus 100, in accordance with an embodiment of the invention. In FIG. 1, the apparatus 100 is seen from a front view. In the discussion herein, the terms that refer to a direction (e.g., top, bottom, front, back, upper, lower, left, right, above, beneath, and other directional terms) are used to denote a direction or position in reference to the apparatus 100 when viewed from the perspective of the user. The apparatus 100 may be gasoline powered or electrically powered which is similar to standard lawn mowers known to those skilled in the relevant art(s). Other standard lawn mower components are not shown in FIG. 1 for purposes of focusing on embodiments of the invention.

The apparatus 100 includes a mower deck 105, a handle 110, and a motor 115 for rotating the blades 120 for cutting grass. The apparatus 100 also includes wheels 125 that allow the user to move the apparatus 100 to different locations.

The apparatus 100 includes an ON/OFF actuator 130 that turns the motor 115 in an on state and an off state. When the motor 115 is in the on state, the motor 115 will rotate the blades 120. When the motor 115 is in the off state, the motor 115 will not rotate the blades 120. The actuator 130 is electrically connected via the control line 135 (e.g., control cable 135) to the motor 115 so that pressing or selecting the actuator 130 will turn the motor 115 in an on-state and pressing (or selecting) the actuator 130 for a second time (or un-pressing the actuator 130) will turn the motor 115 in an off-state. The configuration of the assembly formed by the actuator 130 and control line 135 for turning the motor 115 on or off may also vary from the configuration shown in FIG. 1. For example, another type of control line 135 (instead of a cable 135) may electrically couple the actuator 130 to the motor 115 such as, for example, electrical traces that are disposed along or within the handle 110 and along or inside of the mower deck 105.

In an embodiment, the apparatus 100 also includes at least one of the following actuators or various combinations of at least some of the following actuators: front trimmer actuator 140, first side trimmer actuator 145, second side trimmer actuator 150, and/or multiple-trimmers actuator 155. The actuators 140, 145, 150, and 155 are electrically connected via the control line 160 (e.g., control cable 160) to the trimmer control assembly 165 for controlling the on-state, off-state, retraction, and expansion of the trimmers 170, 175, and 180. The trimmers 170, 175, and 180 can cut any grass, other vegetation, and/or weeds in a manner similar to the cutting performed by a standard hand-held weed-trimmer. The configuration of the assembly formed by the actuators 140, 145, 150, and 155 and control line 160 may also vary from the configuration shown in FIG. 1. For example, another type of control line 160 (instead of a cable 160) may electrically couple the actuators 140, 145, 150, and 155 to the trimmer control assembly 165 such as, for example, electrical traces that are disposed along or within the handle 110 and along or inside of the mower deck 105.

When the user presses or selects the actuator 140, the trimmer control assembly 165 will turn the trimmer 170 in the on state so that control assembly 165 will extend the trimmer 170 out of the opening 181 from the mower deck interior 184 and will rotate the trimmer 170. One or more flailing lines 182 are coupled to the trimmer 170. Therefore, when the trimmer 170 rotates, the flailing lines 182 will also rotate and will cut grass, other vegetation, and/or weeds. When the user presses (or selects) the actuator 140 for a second time (or un-presses the actuator 140), the control assembly 165 will retract the trimmer 170 through the opening 181 into the mower deck interior 184 and will not rotate the trimmer 170 in an off state. Therefore, the trimmer 170 will no longer cut grass, other vegetation, and/or weeds and is conveniently disposed within the interior 184. As a result, the apparatus 100 advantageously prevents the trimmer 170 from coming into contact with objects when the trimmer 170 is in the off state and permits convenient movement and pushing of the apparatus 100 by the user. Therefore, the trimmer 170 is retractable and expandable through a front of the mower deck 105.

When the user presses or selects the actuator 145, the trimmer control assembly 165 will turn the trimmer 175 in the on state so that control assembly 165 will extend the trimmer 175 out of an opening from the mower deck interior 184 in the axial direction 185 and will rotate the trimmer 175. One or more flailing lines 186 are coupled to the trimmer 175. Therefore, when the trimmer 175 rotates, the flailing lines 186 will also rotate and will cut grass, other vegetation, and/or weeds. When the user presses (or selects) the actuator 145 for a second time (or un-presses the actuator 145), the control assembly 165 will retract the trimmer 175 through the same opening into the mower deck interior 184 in the axial direction 187 (which is opposite of the axial direction 185) and will not rotate the trimmer 176 in an off state. Therefore, the trimmer 175 will no longer cut grass, other vegetation, and/or weeds and is conveniently disposed within the interior 184. As a result, the apparatus 100 advantageously prevents the trimmer 175 from coming into contact with objects when the trimmer 175 is in the off state and permits convenient movement and pushing of the apparatus 100 by the user. Therefore, the trimmer 175 is retractable and expandable through a first side of the mower deck 105.

When the user presses or selects the actuator 150, the trimmer control assembly 165 will turn the trimmer 180 in the on state so that control assembly 165 will extend the trimmer 180 out of an opening from the mower deck interior 184 in the axial direction 187 and will rotate the trimmer 180. One or more flailing lines 188 are coupled to the trimmer 180. Therefore, when the trimmer 180 rotates, the flailing lines 188 will also rotate and will cut grass, other vegetation, and/or weeds. When the user presses (or selects) the actuator 150 for a second time (or un-presses the actuator 150), the control assembly 165 will retract the trimmer 180 through the same opening into the mower deck interior 184 in the axial direction 185 (which is opposite of the axial direction 187) and will not rotate the trimmer 180 in an off state. Therefore, the trimmer 180 will no longer cut grass, other vegetation, and/or weeds and is conveniently disposed within the interior 184. As a result, the apparatus 100 advantageously prevents the trimmer 180 from coming into contact with objects when the trimmer 180 is in the off state and permits convenient movement and pushing of the apparatus 100 by the user. Therefore, the trimmer 180 is retractable and expandable through a second side of the mower deck 105.

When the user presses or selects the actuator 155, the trimmer control assembly 165 will turn all of the trimmers 170, 175, and 180 in the on state so that control assembly 165 will extend the trimmer 170 out of the opening 181, will extend the trimmer 176 out of the opening from the mower deck interior 184 in the axial direction 185, will extend the trimmer 180 out of the opening from the mower deck interior 184 in the axial direction 187, and will rotate the trimmers 170, 175, and 180. When the user presses (or selects) the actuator 155 for a second time (or un-presses the actuator 155), the control assembly 165 will retract the trimmer 170 through the opening 181 into the interior 184, will retract the trimmer 175 through the opening into the mower deck interior 184 in the axial direction 187, will retract the trimmer 180 through the opening into the mower deck interior 184 in the axial direction 185, and will not rotate the trimmers 170, 175, and 180 in the off state. Therefore, the trimmers 170, 175, and 180 will no longer cut grass, other vegetation, and/or weeds and are conveniently disposed within the interior 184. As a result, the apparatus 100 advantageously prevents the trimmers 170, 175, and 180 from coming into contact with objects when the trimmers 170, 175, and 180 are in the off state and permits convenient movement and pushing of the apparatus 100 by the user.

In an embodiment of the invention, the apparatus 100 includes all of the three trimmers 170, 175, and 180.

In another embodiment of the invention, the apparatus 100 includes only one of the trimmers 170, 175, and 180. For example, the apparatus 100 includes the trimmer 170. As another example, the apparatus 100 includes the trimmer 175. As another example, the apparatus 100 includes the trimmer 180.

In yet another embodiment of the invention, the apparatus 100 includes only two of the trimmers 170, 175, and 180. For example, the apparatus 100 includes the trimmers 170 and 175. As another example, the apparatus 100 includes the trimmers 170 and 180. As another example, the apparatus 100 includes the trimmers 175 and 180.

Figure 2:
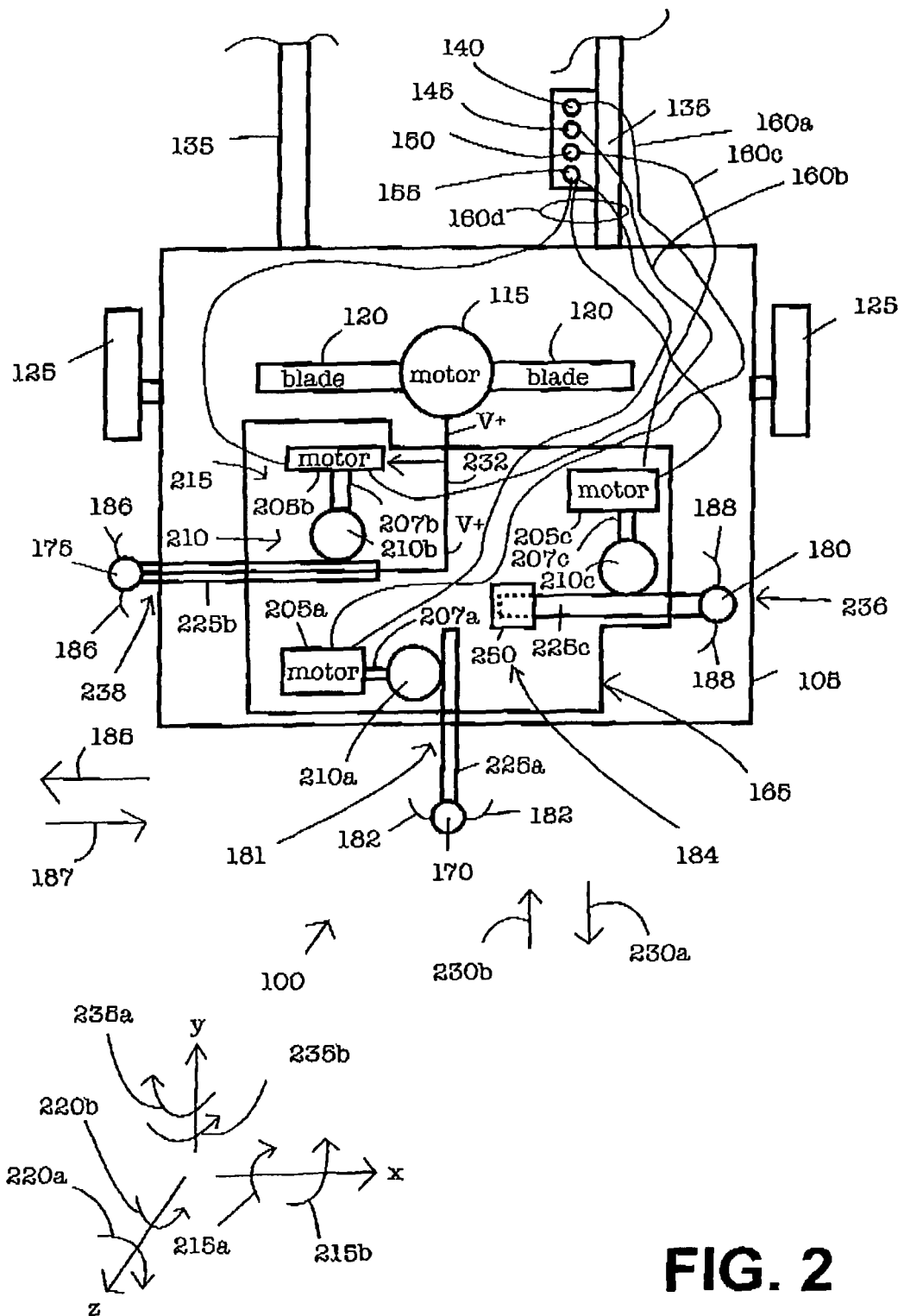
FIG. 2 is a block diagram that shows additional details of a mow and row apparatus, in accordance with an embodiment of the invention.

FIG. 2 is a block diagram that shows additional details of a mow and row apparatus 100, in accordance with an embodiment of the invention. In FIG. 2, the apparatus 100 is seen from a bottom view of the mower deck 105. An embodiment of the trimmer control assembly 165 is shown in FIG. 2.

In an embodiment of the invention, the trimmer control assembly 165 includes a motor assembly 205 which has, for example, the motors 205a, 205b, and 205c as will be discussed below. The motors can be, for example and without limitations, standard servo motors or other suitable motors. The motors can be powered by an AC supply source, by batteries, by portable power supplies, or by voltage generated by the lawn mower motor 115. Suitable motors are commercially available from, for example, AllMotion Company of Union City, Calif., Arc Systems, Inc. of Hauppauge, N.Y., or Allied Electronics, Inc., Fort Worth, Tex., as well as other vendors.

In an embodiment of the invention, the trimmer control assembly 165 also includes a shaft and gear assembly 210 formed by shafts and gears as discussed below. As known to those skilled in the relevant art(s), a gear assembly will convert a motor's rotary motion into a desired reciprocating action. Suitable shafts, gears, and gear assemblies are commercially available from, for example, Rush Gears, Inc. of Fort Washington, Pa., as well as other vendors. The details of shafts and gears that are used for moving an element in the x-axis, y-axis direction, or z-direction (or other directions) are well known to those skilled in the relevant art(s) and are also implemented in commercially-available products and, therefore, these details are not discussed herein for purposes of focusing on the particular features of embodiments of the invention. Those skilled in the art will realize that various configurations can be used to implement the shafts, gears, and motors with the functionalities disclosed herein, and implementing those various configurations based on the functionalities disclosed herein can be performed by those skilled in the are without the need for undue experimentation.

The exemplary positions of the electrical paths 160a, 160b, 160c, and 106d in FIG. 2 are shown only for purposes of discussion and clarity, and the actual positions of these electrical paths 160a, 160b, 160c, and 160d may vary or may be different from the illustrated electrical paths 160a, 160b, 160c, and 160d in FIG. 2. Additionally, these electrical paths 160a, 160b, 160c, and 160c may be formed by the same type of electrical path (e.g., cable or electrical traces) and/or may be formed by a combination of different types of electrical paths (e.g., a cable in combination with an electrical trace where both cable and electrical trace are electrically coupled to each other).

The details of mechanisms that permit a motor to rotate a shaft are known to those skilled in the relevant art(s). As an example, when the user presses (or selects) the actuator 140, the electrical signal along the electrical path 160a will drive the motor 205a to rotate the shaft 207a in the rotational direction 215a along the horizontal x-axis. When the shaft 207a rotates in the rotational direction 215a with respect to the horizontal x-axis, the shaft 207a will rotate the gear 210a in the clockwise direction 220a with respect to z-axis (which is pointing in a direction away from the page that illustrates FIG. 2). The rotation of the gear 210a in the clockwise direction 220a will move the member 225a in the axial direction 230a. When the member 225a moves in axial direction 230a, the trimmer 170 will move from the mower deck interior 184 and through the opening 181 on the mower deck 105 and the trimmer 170 will then be external to the mower deck 105. The trimmer 170 will be in an on state and, accordingly, will rotate at a sufficient speed or revolution so that the flailing line(s) 182 can cut grass, other vegetation, and/or weeds.

As an example, when the user presses (or selects) the actuator 140 for a second time (or un-presses the actuator 140), the electrical signal along the electrical path 160a will drive the motor 205a to rotate the shaft 207a in the rotational direction 215b along the horizontal x-axis (where rotational direction 215b is opposite of the rotational direction 215a). When the shaft 207a rotates in the rotational direction 215b with respect to the horizontal x-axis, the shaft 207a will rotate the gear 210a in the counter-clockwise direction 220b with respect to z-axis (which is pointing in a direction away from the page that illustrates FIG. 2). The rotation of the gear 210a in the counter-clockwise direction 220b will move the member 225a in the axial direction 230b which is opposite of the axial direction 230a. When the member 225a moves in axial direction 230b, the trimmer 170 will move from the exterior of the mower deck 105 and through the opening 181 on the mower deck 105 and the trimmer 170 will then be disposed within the interior 184 of the mower deck 105. The trimmer 170 will also stop rotating. Therefore, the trimmer 170 is conveniently disposed within the interior 184 when the trimmer 170 is not being used and is an off state. Therefore, the motor 205a can expand the trimmer 170 from the interior 184 to the exterior of the mower deck 105 and can retract the trimmer 170 from the exterior of the mower deck 105 to the interior 184 of the mower deck 105. The motors 205b and 205c can perform similar operations on their associated trimmers 175 and 180, respectively.

It is understood that a gear discussed herein can rotate in an opposite direction that was discussed herein, when a shaft is rotating in a particular direction. Therefore, the rotational directions described herein are provided as possible examples of rotations of gears and shafts.

As an example, when the user presses (or selects) the actuator 145, the electrical signal along the electrical path 160b will drive the motor 205b to rotate the shaft 207b in the rotational direction 235a along the horizontal y-axis. When the shaft 207b rotates in the rotational direction 235a with respect to the horizontal y-axis, the shaft 207b will rotate the gear 210b in the clockwise direction 220a with respect to z-axis (which is pointing in a direction away from the page that illustrates FIG. 2). The rotation of the gear 210b in the clockwise direction 220a will move the member 225b in the axial direction 185 as similarly discussed above. When the member 225b moves in axial direction 185, the trimmer 175 will move from the mower deck interior 184 and through the opening 238 on the mower deck 105 and the trimmer 175 will then be external to the mower deck 105. The trimmer 175 will be in an on state and, accordingly, will rotate at a sufficient speed or revolution so that the flailing line(s) 186 can cut grass, other vegetation, and/or weeds.

As an example, when the user presses (or selects) the actuator 145 for a second time (or un-presses the actuator 145), the electrical signal along the electrical path 160b will drive the motor 205b to rotate the shaft 207b in the rotational direction 235b along the horizontal y-axis (where rotational direction 235b is opposite of the rotational direction 235a). When the shaft 207b rotates in the rotational direction 235b with respect to the horizontal y-axis, the shaft 207b will rotate the gear 210b in the counter-clockwise direction 220b with respect to z-axis (which is pointing in a direction away from the page that illustrates FIG. 2). The rotation of the gear 210b in the counter-clockwise direction 220b will move the member 225b in the axial direction 187 which is opposite of the axial direction 185. When the member 225b moves in axial direction 187, the trimmer 175 will move from the exterior of the mower deck 105 and through the opening 238 on the mower deck 105 and the trimmer 175 will then be disposed within the interior 184 of the mower deck 105. The trimmer 175 will also stop rotating. Therefore, the trimmer 175 is conveniently disposed within the interior 184 when the trimmer 175 is not being used and is an off state.

As an example, when the user presses (or selects) the actuator 150, the electrical signal along the electrical path 160c will drive the motor 205c to rotate the shaft 207c in the rotational direction 235a along the horizontal y-axis. When the shaft 207c rotates in the rotational direction 235a with respect to the horizontal y-axis, the shaft 207c will rotate the gear 210c in the clockwise direction 220a with respect to z-axis (which is pointing in a direction away from the page that illustrates FIG. 2). The rotation of the gear 210c in the clockwise direction 220a will move the member 225c in the axial direction 187 as similarly discussed above. When the member 225c moves in axial direction 187, the trimmer 180 will move from the mower deck interior 184 and through the opening 236 on the mower deck 105 and the trimmer 180 will then be external to the mower deck 105. The trimmer 180 will be in an on state and, accordingly, will rotate at a sufficient speed or revolution so that the flailing line(s) 188 can cut grass, other vegetation, and/or weeds. In FIG. 2, the trimmer 180 is current shown as disposed in the interior 184 of the mower deck 105.

As an example, when the user presses (or selects) the actuator 150 for a second time (or un-presses the actuator 150), the electrical signal along the electrical path 160c will drive the motor 205c to rotate the shaft 207c in the rotational direction 235b along the horizontal y-axis (where rotational direction 235b is opposite of the rotational direction 235a). When the shaft 207c rotates in the rotational direction 235b with respect to the horizontal y-axis, the shaft 207c will rotate the gear 210c in the counter-clockwise direction 220b with respect to z-axis (which is pointing in a direction away from the page that illustrates FIG. 2). The rotation of the gear 210c in the counter-clockwise direction 220b will move the member 225c in the axial direction 185 which is opposite of the axial direction 187. When the member 225c moves in axial direction 185, the trimmer 180 will move from the exterior of the mower deck 105 and through the opening 236 on the mower deck 105 and the trimmer 180 will then be disposed within the interior 184 of the mower deck 105. The trimmer 180 will also stop rotating. Therefore, the trimmer 180 is conveniently disposed within the interior 184 when the trimmer 180 is not being used and is an off state.

In an embodiment of the apparatus 100 that includes all three trimmers 170, 175, and 180, the following example operations are now discussed.

As an example, when the user presses (or selects) the actuator 155, the electrical signal along the electrical paths 160d will drive the motor 205a to rotate the shaft 207a in the rotational direction 215a along the horizontal x-axis. When the shaft 207a rotates in the rotational direction 215a with respect to the horizontal x-axis, the shaft 207a will rotate the gear 210a in the clockwise direction 220a with respect to z-axis (which is pointing in a direction away from the page that illustrates FIG. 2). The rotation of the gear 210a in the clockwise direction 220a will move the member 225a in the axial direction 230a. When the member 225a moves in axial direction 230a, the trimmer 170 will move from the mower deck interior 184 and through the opening 181 on the mower deck 105 and the trimmer 170 will then be external to the mower deck 105. The trimmer 170 will be in an on state and, accordingly, will rotate at a sufficient speed or revolution so that the flailing line(s) 182 can cut grass, other vegetation, and/or weeds.

Concurrently with the discussed operation in the previous paragraph, as an example, when the user presses (or selects) the actuator 155, the electrical signal along the electrical paths 160d will drive the motor 205b to rotate the shaft 207b in the rotational direction 235a along the horizontal y-axis. When the shaft 207b rotates in the rotational direction 235a with respect to the horizontal y-axis, the shaft 207b will rotate the gear 210b in the clockwise direction 220a with respect to z-axis (which is pointing in a direction away from the page that illustrates FIG. 2). The rotation of the gear 210b in the clockwise direction 220a will move the member 225b in the axial direction 185 as similarly discussed above. When the member 225b moves in axial direction 185, the trimmer 175 will move from the mower deck interior 184 and through the opening 238 on the mower deck 105 and the trimmer 175 will then be external to the mower deck 105. The trimmer 175 will be in an on state and, accordingly, will rotate at a sufficient speed or revolution so that the flailing line(s) 186 can cut grass, other vegetation, and/or weeds.

Concurrently with the discussed operation in the previous paragraph, as an example, when the user presses (or selects) the actuator 155, the electrical signal along the electrical paths 160d will drive the motor 205c to rotate the shaft 207c in the rotational direction 235a along the horizontal y-axis. When the shaft 207c rotates in the rotational direction 235a with respect to the horizontal y-axis, the shaft 207c will rotate the gear 210c in the clockwise direction 220a with respect to z-axis (which is pointing in a direction away from the page that illustrates FIG. 2). The rotation of the gear 210c in the clockwise direction 220a will move the member 225c in the axial direction 187 as similarly discussed above. When the member 225c moves in axial direction 187, the trimmer 180 will move from the mower deck interior 184 and through the opening 236 on the mower deck 105 and the trimmer 180 will then be external to the mower deck 105. The trimmer 180 will be in an on state and, accordingly, will rotate at a sufficient speed or revolution so that the flailing line(s) 188 can cut grass, other vegetation, and/or weeds. In FIG. 2, the trimmer 180 is current shown as disposed in the interior 184 of the mower deck 105.

As another example, when the user presses (or selects) the actuator 155 for a second time (or un-presses the actuator 155), the electrical signal along the electrical paths 160d will drive the motor 205a to rotate the shaft 207a in the rotational direction 215b along the horizontal x-axis (where rotational direction 215b is opposite of the rotational direction 215a). When the shaft 207a rotates in the rotational direction 215b with respect to the horizontal x-axis, the shaft 207a will rotate the gear 210a in the counter-clockwise direction 220b with respect to z-axis (which is pointing in a direction away from the page that illustrates FIG. 2). The rotation of the gear 210a in the counter-clockwise direction 220b will move the member 225a in the axial direction 230b which is opposite of the axial direction 230a. When the member 225a moves in axial direction 230b, the trimmer 170 will move from the exterior of the mower deck 105 and through the opening 181 on the mower deck 105 and the trimmer 170 will then be disposed within the interior 184 of the mower deck 105. The trimmer 170 will also stop rotating. Therefore, the trimmer 170 is conveniently disposed within the interior 184 when the trimmer 170 is not being used and is an off state.

Concurrently with the discussed operation in the previous paragraph, as an example, when the user presses (or selects) the actuator 155 for a second time (or un-presses the actuator 155), the electrical signal along the electrical paths 160d will drive the motor 205b to rotate the shaft 207b in the rotational direction 235b along the horizontal y-axis (where rotational direction 235b is opposite of the rotational direction 235a). When the shaft 207b rotates in the rotational direction 235b with respect to the horizontal y-axis, the shaft 207b will rotate the gear 210b in the counter-clockwise direction 220b with respect to z-axis (which is pointing in a direction away from the page that illustrates FIG. 2). The rotation of the gear 210b in the counter-clockwise direction 220b will move the member 225b in the axial direction 187 which is opposite of the axial direction 185. When the member 225b moves in axial direction 187, the trimmer 175 will move from the exterior of the mower deck 105 and through the opening 238 on the mower deck 105 and the trimmer 175 will then be disposed within the interior 184 of the mower deck 105. The trimmer 175 will also stop rotating. Therefore, the trimmer 175 is conveniently disposed within the interior 184 when the trimmer 175 is not being used and is an off state.

Concurrently with the discussed operation in the previous paragraph, as an example, when the user presses (or selects) the actuator 155 for a second time (or un-presses the actuator 155), the electrical signal along the electrical path 160d will drive the motor 205c to rotate the shaft 207c in the rotational direction 235b along the horizontal y-axis (where rotational direction 235b is opposite of the rotational direction 235a). When the shaft 207c rotates in the rotational direction 235b with respect to the horizontal y-axis, the shaft 207c will rotate the gear 210c in the counter-clockwise direction 220b with respect to z-axis (which is pointing in a direction away from the page that illustrates FIG. 2). The rotation of the gear 210c in the counter-clockwise direction 220b will move the member 225c in the axial direction 185 which is opposite of the axial direction 187. When the member 225c moves in axial direction 185, the trimmer 180 will move from the exterior of the mower deck 105 and through the opening 236 on the mower deck 105 and the trimmer 180 will then be disposed within the interior 184 of the mower deck 105. The trimmer 180 will also stop rotating. Therefore, the trimmer 180 is conveniently disposed within the interior 184 when the trimmer 180 is not being used and is an off state.

In an embodiment of the invention, the apparatus 100 includes a lawn mower motor 155 that is coupled by an electrical path 232 to the motors 205a, 205b, and 205c and is coupled by the same electrical path 232 (or another electrical path in another embodiment of the apparatus 100) to the trimmers 170, 175, and 180. Therefore, the lawn mower motor 155 generates voltage V+ that can transmit as an electrical current along path 232 and this voltage V+ can provide power to permit operations of the motors 205a, 205b, and 205c and trimmers 170, 175, and 180. The path 232 can be, for example, an electrical trace or other suitable conductive paths.

In an embodiment of the invention, the apparatus 100 include suitable mechanisms for securing the members 225a, 225b, and 225c to the mower deck 105 interior surface and for permitting the members 225a, 225b, and 225c to slide, expand, and retract as similarly discussed above. For example, in an embodiment of the invention, the member 225c is secured to the mower deck 105 interior surface by a sleeve 250. The member 225c is slidably disposed within the sleeve 250 interior. Therefore, the member 225 is slidable, expandable, and retractable through the sleeve 250. The members 225a and 225b may be secured to the interior surface of the mower deck 184 by a similar type of sleeve 250 or another type of suitable mechanism.

Figure 3:
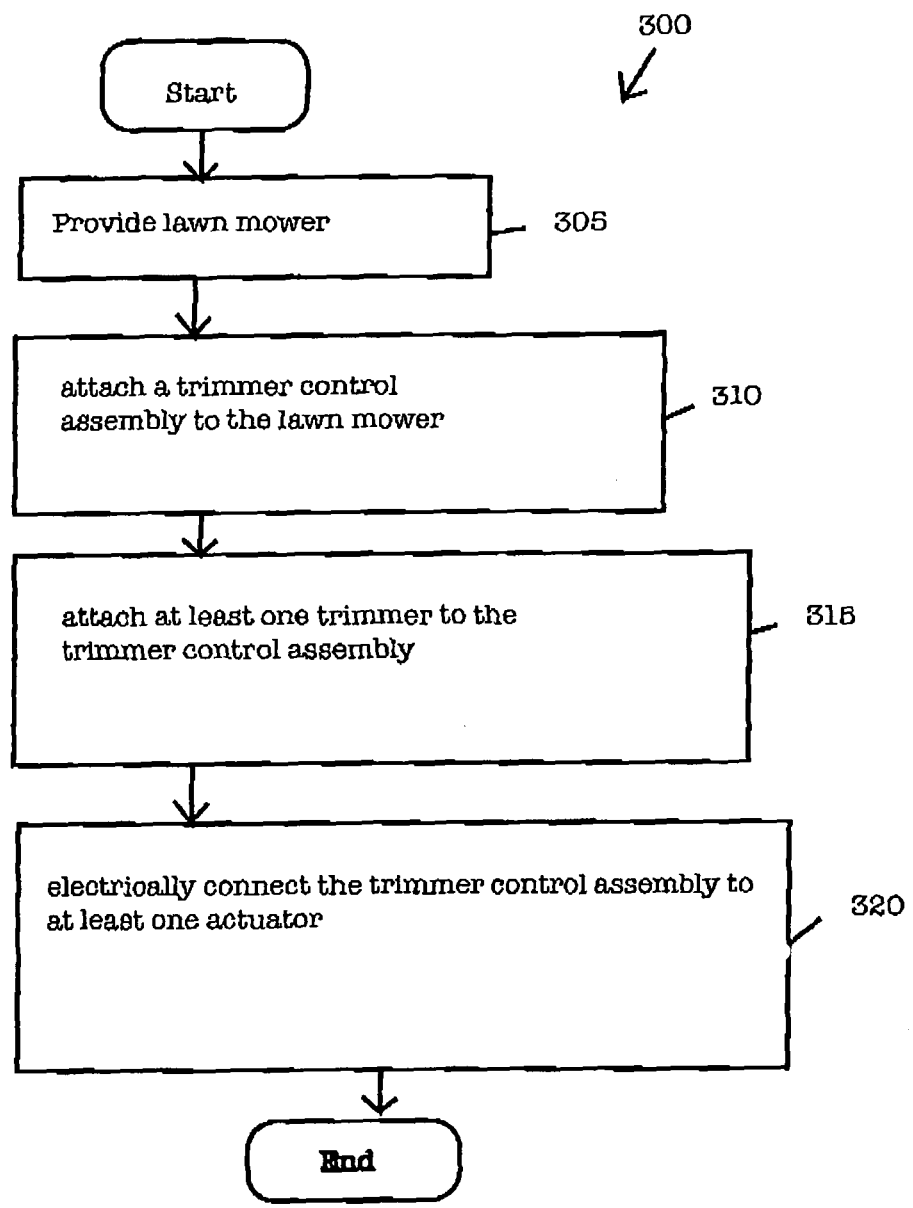
FIG. 3 is a flow diagram of a method of assembling a mow and row apparatus, in accordance with an embodiment of the invention.

FIG. 3 is a flow diagram of a method 300 of assembling a mow and row apparatus, in accordance with an embodiment of the invention. In block 305, a lawn mower is provided. In block 310, a trimmer control assembly 165 is attached to the lawn mower. In block 315, at least one trimmer is attached to the trimmer control assembly 165. For example, one or more of the trimmers 170, 175, and 180 can be attached to the trimmer control assembly 165. In block 320, the trimmer control assembly 165 is electrically connected to at least one actuator. For example, the trimmer control assembly 165 is electrically connected to at least one of the actuators 140, 145, 150, and 155.

Figure 4:
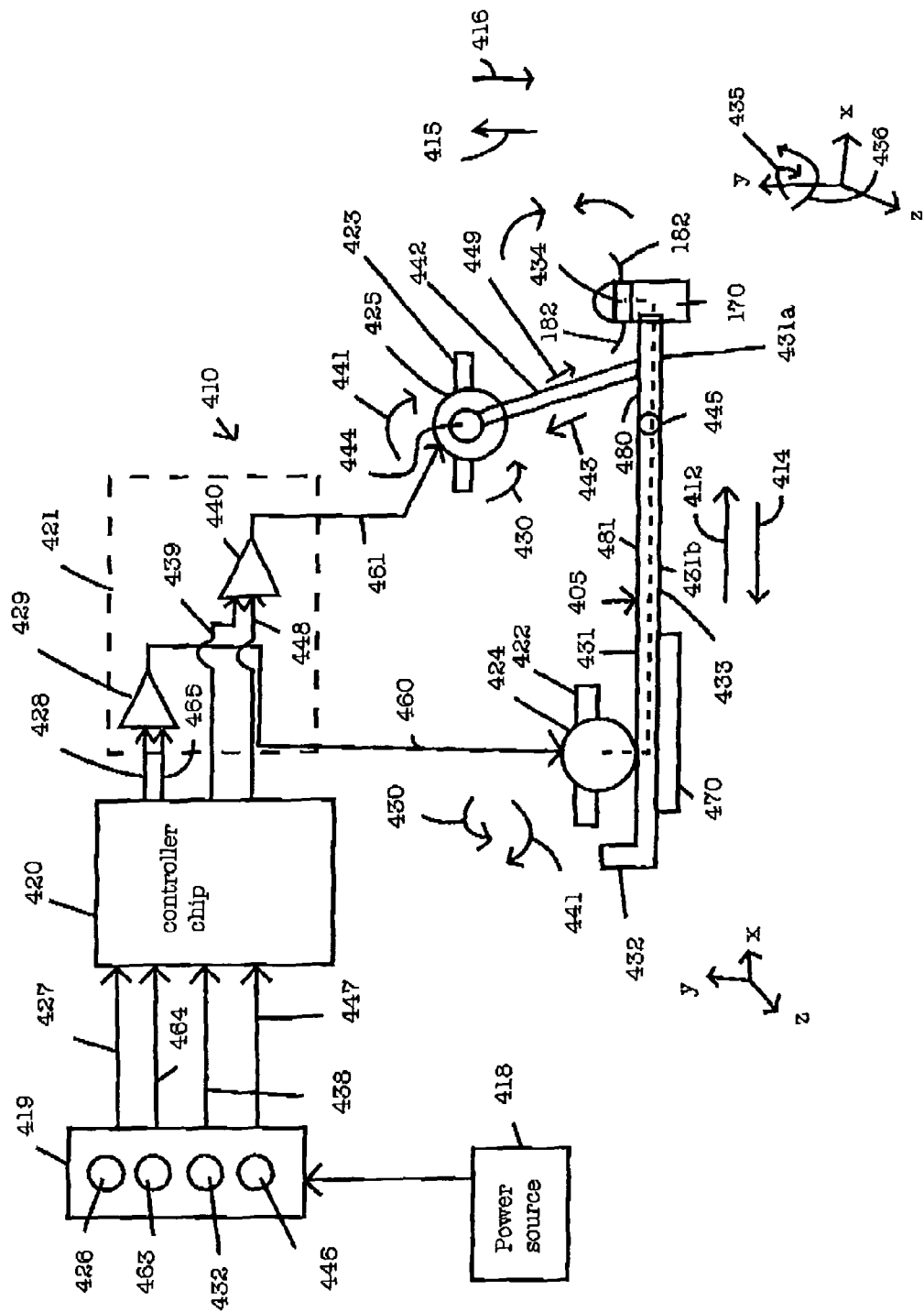
FIG. 4 is a block diagram of a movable trimmer and associated circuitry, in accordance with another embodiment of the invention.

FIG. 4 is a block diagram of a movable trimmer assembly 405 and associated circuitry 410, in accordance with another embodiment of the invention. The movable trimmer assembly 405 and associated circuitry 410 is included in a lawn mower (e.g. a lawn mower 500 in FIG. 5). The circuitry 410 allows the user of the lawn mower to move and control the movement of the movable trimmer 405 in the opposed horizontal directions 412 and 414 (along the x-axis)) and in the opposed vertical directions 415 and 416 (along the y-axis) so that the trimmer 170 can weedeat and edge the vegetations or weeds. Therefore, the trimmer 170 is movable in the vertical directions 415 and 416. The trimmer assembly 405 includes the spinning trimmer 182 as similarly discussed above with one or more lines 182 that will rotate or spin so the lines 182 can cut vegetation.

In one embodiment, the circuitry 410 includes the following components. A voltage source 418 provides voltage and power for the operations discussed below and to the user interface 419, controller chip 420 (or controller 420), amplification stage 421, and motors 422 and 423 for moving the gears 424 and 425, respectively. The amplification stage 421 includes the amplifiers 429 and 440. The amplifier 429 is coupled by the conductive path 460 to the motor 422 while the amplifier 429 is coupled by the conductive path 461 to the motor 423. The conductive paths 460 and 461 may be traces or other suitable types of conductive paths formed on the mower deck 505 (FIG. 5) of the lawn mower 500.

The controller 420 can be any suitable controller or microcontroller for generating control signals and are commercially available from various vendors. Typically, the controller 420 and amplification stage 421 are implemented as computer chips. As will be discussed below, the controller 420 is configured to control the movements of the trimmer assembly 405 and the trimmer 170.

The voltage source 418 may be, by way of example and not by way of limitation, a battery source, a power source connected to a wall outlet and connectable by a power cord to the lawn mower, or a portable DC power source connectable by a power cord to the lawn mower.

Various exemplary operations of the movable trimmer assembly 405 and circuitry 410 are now discussed. When the user presses or otherwise selects the button 426 in the interface 419, the interface 419 sends the first signal 427 into the controller 420 which then outputs the first control signal 428 which may be amplified by (and is driven into the motor 422 by) the amplifier 429. The first control signal 428 will cause the motor 422 to spin the gear 424 in the counter-clockwise direction 430 along the z-axis (which projects from the plane of the page showing FIG. 4). In response to the movement of the gear 424 in the counter-clockwise direction 430, the shaft 431 will move in the direction 412. Therefore, the gear 424 is in contact with and operates with the shaft 431 in order to form a gear-shaft assembly. Since the shaft 431 moves in the direction 412, the trimmer 170 will move to a position external to the mower deck 505 (FIG. 5) and can perform the edging of vegetation or grass or weeds.

Typically, the shaft 431 will include a blocking member 432 that protrudes in the y-axis so that the blocking member 432 will eventually block the movement of the shaft 431 in the direction 412 when the blocking member 432 comes into contact with the gear 424.

The first control signal 428 also transmits along the conductive path 433 and will cause the motor 434 to spin in the clockwise direction 435 (or counter-clockwise direction 436 in another embodiment) along the y-axis. Since the motor 434 is spinning, the line(s) 182 attached to the motor 434 will also spin in the same direction as the motor 434 and this spin will allow the line(s) 182 to cut vegetation. In one embodiment, since the first control signal 428 will reach the motor 422 prior to reaching the motor 434, the trimmer 170 will spin after the shaft 431 has been extended externally from the body 505 (FIG. 5) of the lawn mower 500. Additional signal buffers may be included in the conductive path 433 in order to further delay the spinning of the motor 434 after the motor 422 has started to spin the gear 424.

The user can also cause the trimmer 170 to move up and down along the directions 415 and 416 in the following examples. When the user presses or otherwise selects the button 437 in the interface 419, the interface 419 sends the second signal 438 into the controller 420 which then outputs the second control signal 439 which may be amplified by (and is driven into the motor 423 by) the amplifier 440. The second control signal 439 will cause the motor 423 to spin the gear 425 in the clockwise direction 441 along the z-axis (which projects from the plane of the page showing FIG. 4). In response to the movement of the gear 425 in the clockwise direction 441, the gear 425 will pull the member 442 in the direction 443 toward the gear 425. As a result, the trimmer 170 will move upward 415 in a vertical direction along the y-axis and the string(s) 182 can cut vegetation as the trimmer 170 is moving upward 415. The member 442 can be any flexible material such as, for example, rubber and is coupled to the shaft 431 and a pulley 444 that will be spun by the gear 425 and that will pull, wind, and retract the member 442 in the direction 443. The material 442 may be coupled to the pulley 444 and shaft 431 by any suitable fastening methods and/or fastening mechanisms or coupling mechanisms, as known to those skilled in the relevant art(s).

The shaft 431 also pivots in the upward direction 415 and downward direction 416 along the pivot member 445 which joins the front shaft portion 431a and rear shaft portion 431b. Therefore, when the pulley 444 pulls the shaft 431 in the direction 443, the front shaft portion 431a will not be parallel to the rear shaft portion 431b and will be in an angled position with respect to the rear shaft portion 431b.

When the user presses or otherwise selects the button 446 in the interface 419, the interface 419 sends the third signal 447 into the controller 420 which then outputs the third control signal 448 which may be amplified by (and is driven into the motor 423 by) the amplifier 440. The second control signal 439 and third control signal 448 may be of opposite voltage polarities. The third control signal 448 will cause the motor 423 to spin the gear 425 in the counter-clockwise direction 430 along the z-axis (which projects from the plane of the page showing FIG. 4). In response to the movement of the gear 425 in the counter-clockwise direction 430, the gear 425 will release the member 442 in the direction 449 because the pulley 444 is rotating counter-clockwise 430. As a result, the trimmer 170 will move downward 416 in a vertical direction along the y-axis and the string(s) 182 can cut vegetation as the trimmer 170 is moving downward 416. Those skilled in the relevant art(s) will realize based on the disclosure herein that the pulley 444 can be oppositely configured so that a counter-clockwise rotation 430 of the pulley 444 will pull the member 442 in the direction 443 toward the pulley 444 and a clockwise rotation 441 of the pulley 444 will release the member 442 toward the direction 449.

The shaft 431 also pivots in the downward direction 416 along the pivot member 445. Therefore, when the pulley 444 releases the front shaft portion 431a in the direction 449, the front shaft portion 431a will become parallel (or substantially parallel) to the rear shaft portion 431b.

When the user presses or otherwise selects the button 463 in the interface 419, the interface 419 sends the fourth signal 464 into the controller 420 which then outputs the fourth control signal 465 which may be amplified by (and is driven into the motor 422 by) the amplifier 429. The first control signal 428 and the fourth control signal 465 may be of opposite voltage polarities. The fourth control signal 465 will cause the motor 422 to spin the gear 424 in the clockwise direction 441 along the z-axis (which projects from the plane of the page showing FIG. 4). In response to the movement of the gear 424 in the clockwise direction 441, the shaft 431 will move in the direction 414 along the x-axis. Therefore, the movable trimmer 170 will be retracted from a position external to the mower deck 505 (FIG. 5) to a position internal within the mower deck 505. The fourth control signal 465 will also terminate the rotation of the motor 434 and, therefore, the line(s) 182 will stop rotating.

In an embodiment of the invention, the motors 422 and 423 (and/or the gears 424 and 425) may be coupled to and/or mounted on the internal surface 510 (FIG. 5) of the mower deck 505. Additionally, a support member 470 may support and permit the slidable movement (in directions 412 and 414) of the shaft 431. The support member 470 may be coupled to and/or mounted on the internal surface 510 of the mower deck 505 and may be in any suitable configuration to allow the slidable movement of the shaft 431.

In another embodiment of the invention, the pulley 444 can rotate along the direction 430 in order to retract the front shaft portion 431a in the counter-clockwise direction 430 when the trimmer 170 is no longer operating. This retraction feature of shaft 431 can be included in any one of the shaft assemblies 405, 535, and 540 (or on all of the shaft assemblies 405, 535, and 540). When the user turns off the trimmer 170 as discussed above, the pulley 444 will retract the front shaft portion 431a in the direction 430 so that the top surface 480 of the front shaft portion 431a will rest on (or will be substantially adjacent to) the top surface 481 of the rear shaft portion 431b. Therefore, in this embodiment of the invention, there is no need to retract the shaft 431 in the axial direction 414. When the front shaft portion 431a rotates in the direction 430, the portion 431a will pass through an opening 482 (FIG. 1) in mower deck 105 so that the surfaces 480 and 481 are in contact with each other (or are adjacent to each other).

When the user turns on the trimmer 170 as discussed above, the pulley 444 will rotate in the direction 441 so that the top surface 480 of the front shaft portion 431a separate and move away from the top surface 481 of the rear shaft portion 431b. Therefore, in this embodiment of the invention, there is no need to extend the shaft 431 in the axial direction 412. When the front shaft portion 431a rotates in the direction 441, the portion 431a will pass through an opening 482 (FIG. 1) in mower deck 105 so that the surfaces 480 and 481 are separate from each other and are parallel to each other, and the portions 431a and 431b are parallel to the X-axis. The joint 445 may be spring loaded in the direction 441 so that when the pulley 444 loosens the slack on the pull member 442, the joint 445 will rotate the front shaft portion 431a in the direction 441. Those skilled in the art will realize based on the disclosure herein that the pulley 444 may be placed in a suitable position within the mower deck 105 so that the surfaces 480 and 481 can come into contact with each other and can separate from each other as discussed above. Therefore, the position of the pulley 444 as shown in FIG. 4 is for mere ease of discussion of an embodiment of the invention.

In another embodiment of the invention, the pulley 444 is omitted. Instead, the element 445 is a motor 445 that is controlled by the user so that when the user presses the button 437, the motor 445 will spin in the clockwise direction 441 to rotate the arm 431a in the clockwise direction 441. When the user presses the button 446, the motor 445 will spin in the counter-clockwise direction 430 to rotate the arm 431a in the counter-clockwise direction 441. The motor 445 is coupled to the arms 431b and 431a.

Figure 5:
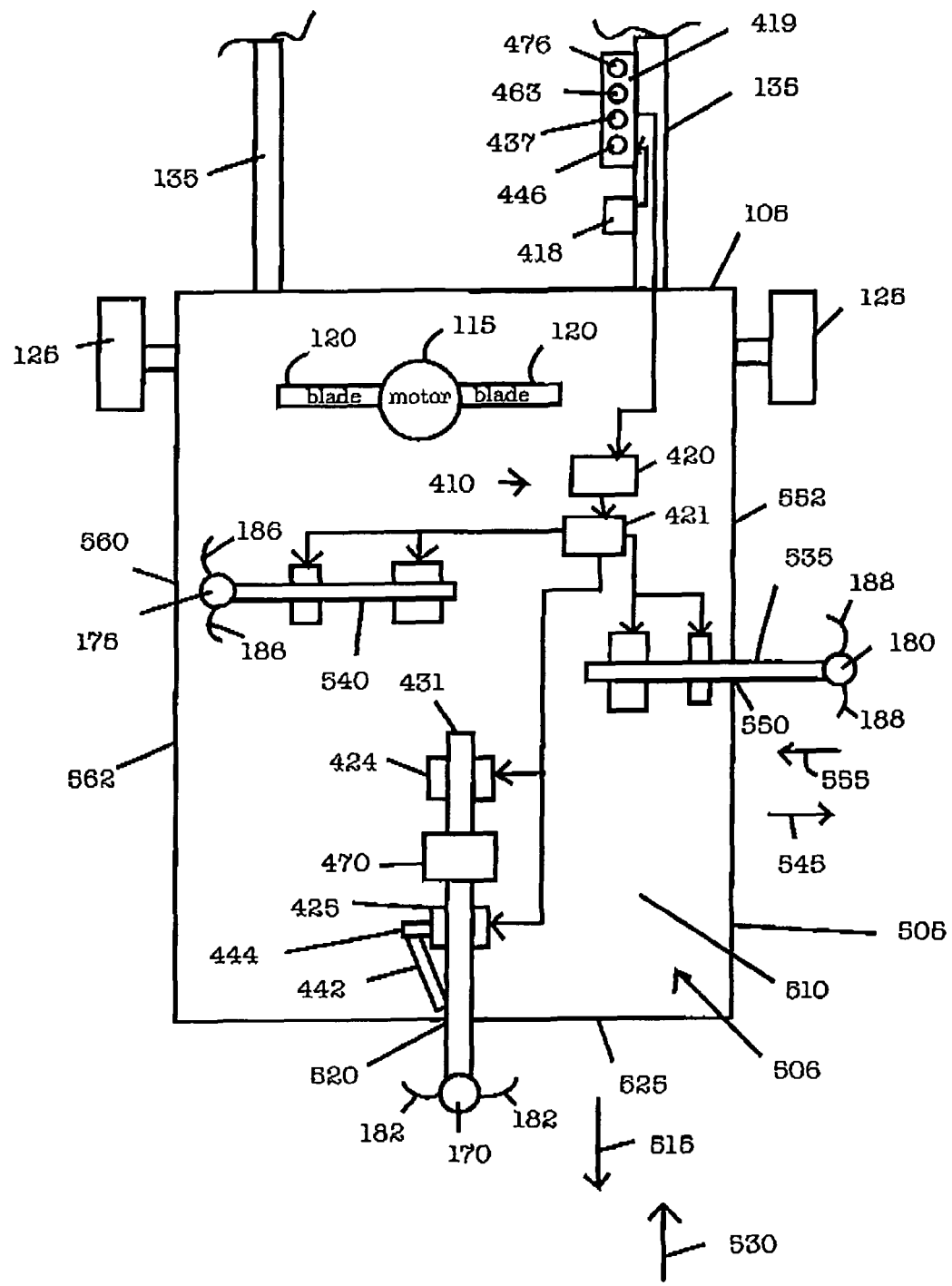
FIG. 5 is a block diagram of a mow and row apparatus that includes the circuitry of FIG. 4, in accordance with an embodiment of the invention.
Figure 6:
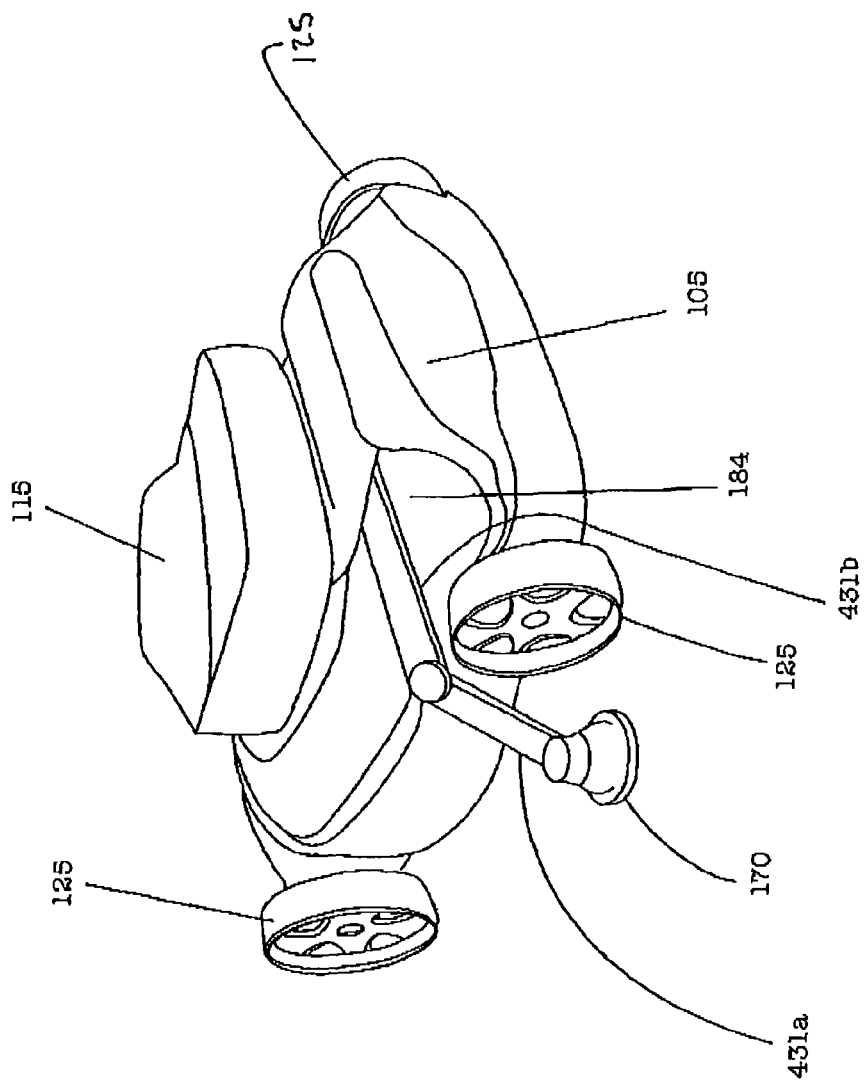
FIG. 6 is a block diagram of a mow row apparatus shown in a perspective view, in accordance with an embodiment of the invention.

FIG. 5 is a block diagram of a mow and row apparatus 500 that includes the circuitry 410 of FIG. 4, in accordance with an embodiment of the invention. Similar lawn mowing components in FIG. 5 are similarly discussed and shown with reference to FIG. 2. The movable trimmer 431 is movable externally from the mower deck 505 and can be retracted within the interior 506 of the mower deck 505 and is adjacent to the interior surface 510 of the mower deck 505. As an example, the movable trimmer 431 can extend in the direction 515 through an opening 520 of the front 525 of the mower deck 505 so that the trimmer 431 is external to the mower deck 505. The movable trimmer 431 can also retract in the direction 530 through the opening 520 so that the trimmer 431 is retracted within and is internally located within the interior 506 of the mower deck 505. The directions 515 and 530 are opposite to each other.

In an embodiment, the apparatus 500 may include the additional movable trimmer assembly 535 and/or the additional trimmer assembly 540. The trimmers 535 and 540 includes components and gears and shafts similar to those of the trimmer 431 with reference to FIG. 4 and operates similarly as the trimmer 431. As an example, the movable trimmer 535 can extend in the direction 545 through an opening 550 of the first side 552 of the mower deck 505 so that the trimmer 535 is external to the mower deck 505. The movable trimmer 535 can also retract in the direction 555 through the opening 550 so that the trimmer 535 is retracted within and is internally located within the interior 506 of the mower deck 505.

Similarly, the movable trimmer 540 can extend in the direction 555 through an opening 560 of the second side 562 of the mower deck 505 so that the trimmer 540 is external to the mower deck 505. The movable trimmer 540 can also retract in the direction 545 through the opening 560 so that the trimmer 540 is retracted within and is internally located within the interior 506 of the mower deck 505.

The circuitry 410 including the controller 420 and amplifier stage 421 may be used to control the above-described movements and operations of the additional trimmers 535 and 540.

In another embodiment of the invention, a method for assembling a mow and row apparatus includes providing a lawn mower 500 (FIG. 5), attaching a circuitry 410 to the lawn mower 500, and attaching at least one trimmer 421 to the circuitry 410. The circuitry 410 may be attached to the interior 506 or interior surface 510 of the mower deck 505 of the lawn mower 500.

Other possible variations in an embodiment of the invention are disclosed above.

Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art(s) will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A mow and row apparatus comprising:
   a lawn mower including a mower deck, a handle, a lawn mower motor, and a lawn mower blade configured for rotation by the lawn mower motor; and
   wherein the lawn mower further includes:
   at least one expandable and retractable trimmer;
   a trimmer control assembly configured to control the trimmer; and
   at least one actuator configured to turn the trimmer in an on state and in an off state;
   wherein the control assembly extends the trimmer out of an opening of the mower deck so that the trimmer is external to the mover deck and extends the trimmer in a first horizontal axial direction in response to the trimmer turning in the on state;
   wherein the control assembly extends the trimmer out of the opening of the mower deck and rotates the trimmer;
   wherein the control assembly retracts the trimmer into the opening of the mower deck so that the trimmer is disposed within an interior of the mower deck and retracts the trimmer in a second horizontal axial direction in response to the trimmer turning in the off state; and
   wherein the first horizontal axial direction is opposite to the second horizontal axial direction.

2. The apparatus of claim 1, wherein the trimmer is retractable and expandable through a front of the mower deck.

3. The apparatus of claim 1, wherein the trimmer is retractable and expandable through a first side of the mower deck.

4. The apparatus of claim 1, wherein the trimmer is retractable and expandable through a second side of the mower deck.

5. The apparatus of claim 1, wherein the lawn mower includes at least two expandable and retractable trimmers.

6. The apparatus of claim 1, wherein the lawn mower includes at least three expandable and retractable trimmers.

7. The apparatus of claim 1, wherein the trimmer is expandable externally from the mower deck.

8. The apparatus of claim 1, wherein the trimmer is retractable and can be disposed in the interior of the mower deck.

9. The apparatus of claim 1, further comprising:
   wherein the trimmer control assembly comprises a shaft coupled to the trimmer and a user interface including a first button and a second button;
   wherein the shaft comprises a first arm and a second arm and a motor coupled between the first arm and the second arm;
   wherein the trimmer is coupled to the first arm;
   wherein, in response to a user pressing the first button, the motor rotates the first arm in a clockwise direction while the second arm is parallel to a horizontal X-axis; and
   wherein, in response to the user pressing the second button, the motor rotates the first arm in a counter-clockwise direction while the second arm is parallel to the horizontal X-axis.

10. The apparatus of claim 1, further comprising:
    wherein the trimmer control assembly comprises a pulley, a shaft coupled to the trimmer, and a user interface including a first button and a second button;
    wherein the shaft comprises a first arm and a second arm and a pivot member coupled between the first arm and the second arm;
    wherein the trimmer is coupled to the first arm;
    wherein the pulley is coupled to the first arm;
    wherein, in response to a user pressing the first button, the pulley rotates the first arm in a clockwise direction while the second arm is parallel to a horizontal X-axis; and
    wherein, in response to the user pressing the second button, the pulley rotates the first arm in a counter-clockwise direction while the second arm is parallel to the horizontal X-axis.

11. The apparatus of claim 10, wherein the trimmer control assembly comprises:
    a motor configured to expand and retract the trimmer.

12. The apparatus of claim 11, wherein the trimmer control assembly comprises:
    a shaft coupled to the motor and a gear coupled to the shaft and configured to expand and retract the trimmer.

13. The apparatus of claim 12, wherein the trimmer is coupled to the shaft and the gear is configured to move the shaft along the first horizontal axial direction and second horizontal axial direction.

14. The apparatus of claim 1, wherein the lawn mower motor is configured to provide voltage for powering the trimmer.

15. The apparatus of claim 1, wherein the trimmer is movable in a vertical direction.

16. The apparatus of claim 1, further comprising a voltage source configured to provide voltage for powering the trimmer.

17. The apparatus of claim 1, further comprising: a controller configured to control movements of the trimmer.

18. A mow and row apparatus comprising:
    a lawn mower including a mower deck, a handle, a lawn mower motor, and a lawn mower blade configured for rotation by the lawn mower motor; and
    wherein the lawn mower further includes:
    at least one means for trimming;
    a trimmer control assembly configured to control the trimming means; and
    at least one actuator configured to turn the trimming means in an on state and in an off state;
    wherein the control assembly extends the trimming means out of an opening of the mower deck so that the trimming means is external to the mover deck and extends the trimming means in a first horizontal axial direction in response to the trimming means turning in the on state;
    wherein the control assembly extends the trimming means out of the opening of the mower deck and rotates the trimming means;

wherein the control assembly retracts the trimming means into the opening of the mower deck so that the trimming means is disposed within an interior of the mower deck and retracts the trimming means in a second horizontal axial direction in response to the trimmer turning in the off state; and wherein the first horizontal axial direction is opposite to the second horizontal axial direction.

19. The apparatus of claim 18, wherein the means for trimming is movable in a clockwise direction and in a counter-clockwise direction.

20. A method for assembling a mow and row apparatus, the method comprising:

providing a lawn mower including a mower deck;

attaching a circuitry to the lawn mower, wherein the circuitry comprises a trimmer control assembly; and attaching at least one trimmer to the trimmer control assembly;

wherein the trimmer control assembly is configured to control the trimmer; and providing at least one actuator that is electrically coupled to the trimmer, wherein the at least one actuator is configured to turn the trimmer in an on state and in an off state;

wherein the control assembly extends the trimmer out of an opening of the mower deck so that the trimmer is external to the mover deck and extends the trimmer in a first horizontal axial direction in response to the trimmer turning in the on state;

wherein the control assembly extends the trimmer out of the opening of the mower deck and rotates the trimmer;

wherein the control assembly retracts the trimmer into the opening of the mower deck so that the trimmer is disposed within an interior of the mower deck and retracts the trimmer in a second horizontal axial direction in response to the trimmer turning in the off state; and wherein the first horizontal axial direction is opposite to the second horizontal axial direction.

* * * * *